United States Patent
Keithley

(10) Patent No.: US 9,104,941 B1
(45) Date of Patent: Aug. 11, 2015

(54) METHOD AND APPARATUS FOR REDUCING NOISE IN A SCANNED IMAGE WHILE MINIMIZING LOSS OF DETAIL IN THE SCANNED IMAGE

(71) Applicant: Marvell International Ltd., Hamilton (BM)

(72) Inventor: Douglas G Keithley, Boise, ID (US)

(73) Assignee: Marvell International Ltd., Hamilton (BM)

( * ) Notice: Subject to any disclaimer, the term of this patent is extended or adjusted under 35 U.S.C. 154(b) by 401 days.

(21) Appl. No.: 13/689,563

(22) Filed: Nov. 29, 2012

Related U.S. Application Data

(60) Provisional application No. 61/566,381, filed on Dec. 2, 2011.

(51) Int. Cl.
*G06K 9/40* (2006.01)
*G06K 9/20* (2006.01)

(52) U.S. Cl.
CPC ... G06K 9/40 (2013.01); G06K 9/20 (2013.01)

(58) Field of Classification Search
None
See application file for complete search history.

(56) References Cited

U.S. PATENT DOCUMENTS

| | | | | |
|---|---|---|---|---|
| 7,164,787 B1* | 1/2007 | Nevis et al. | | 382/154 |
| 2003/0021489 A1* | 1/2003 | Miura et al. | | 382/260 |
| 2003/0190086 A1* | 10/2003 | Kim | | 382/275 |
| 2004/0071363 A1* | 4/2004 | Kouri et al. | | 382/276 |
| 2005/0035977 A1* | 2/2005 | Yokoyama et al. | | 345/611 |
| 2005/0152612 A1* | 7/2005 | Spaulding et al. | | 382/254 |
| 2006/0245666 A1* | 11/2006 | Petrosyan et al. | | 382/275 |
| 2007/0103570 A1* | 5/2007 | Inada et al. | | 348/252 |
| 2007/0133893 A1* | 6/2007 | Jerdev | | 382/254 |
| 2009/0310880 A1* | 12/2009 | Yokoyama et al. | | 382/260 |
| 2012/0147226 A1* | 6/2012 | Takatori | | 348/246 |

OTHER PUBLICATIONS

"A Modified Sigma Filter for Noise Reduction in Images" ICCOM'05 Proceedings of the 9th WSEAS International Conference on Communications 2005.*

"A switching median filter with boundry discriminative noise detection for extremely corrupted images." IEEE 2006.*

* cited by examiner

*Primary Examiner* — Sean Motsinger

(57) ABSTRACT

Methods of filtering random noise and salt and pepper noise that minimize a loss of detail in an image are described. Sample values of an image that are within a tolerance within a sliding window are used to normalize a sample centered in the sliding window to filter random noise and minimize a loss of detail in an image. Sample values of an image in a sliding window are sorted into a sorted array, and mapped to values based on pre-defined regions of the sorted array to filter salt and pepper noise and minimize a loss of detail in an image.

18 Claims, 11 Drawing Sheets

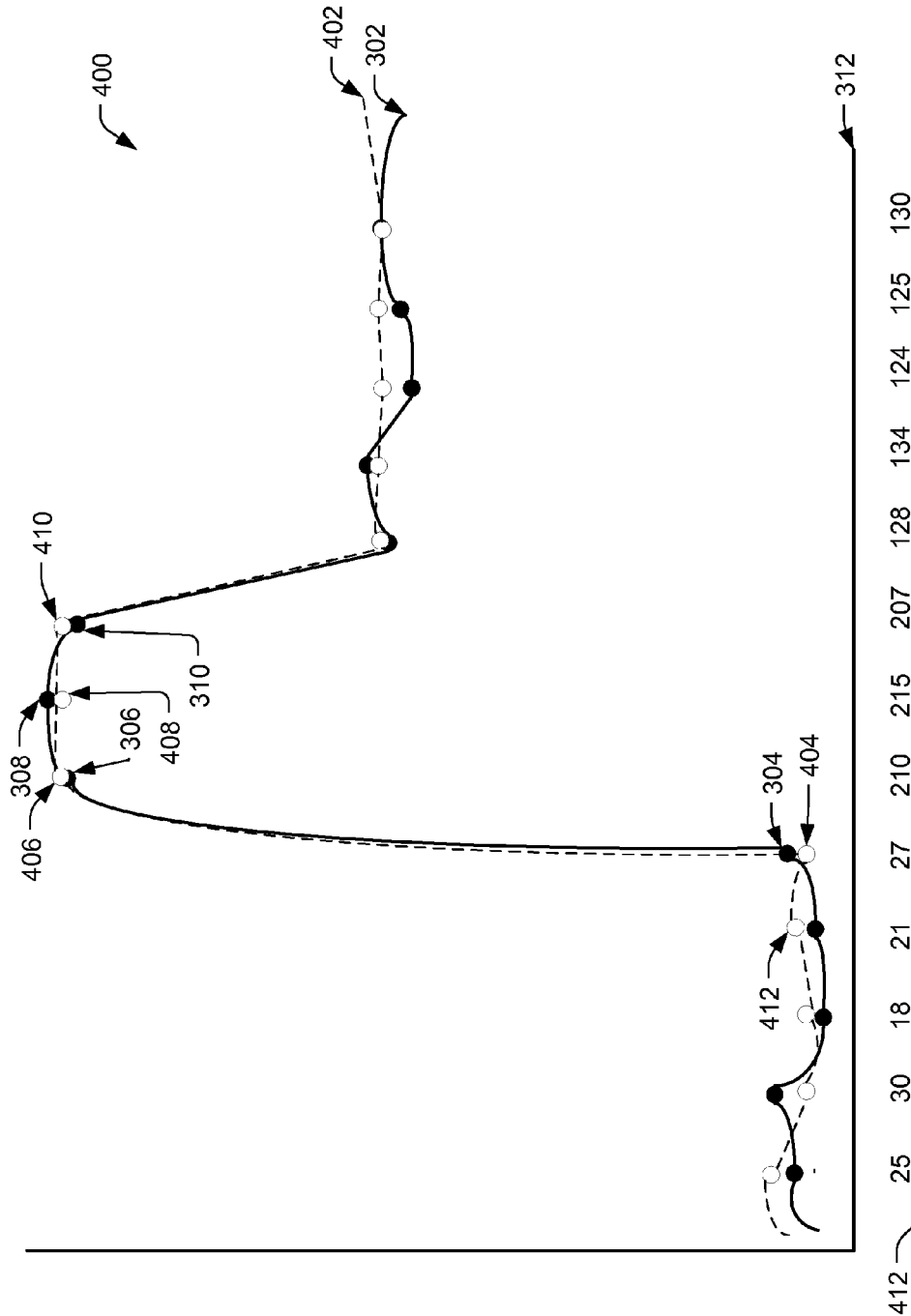

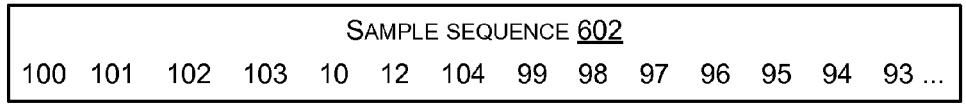
Fig. 6a
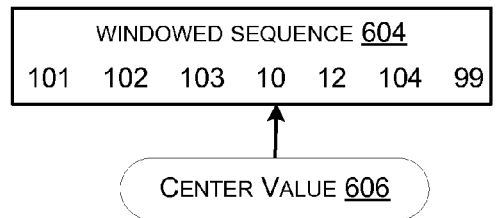
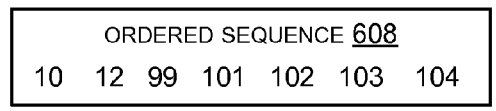
Fig. 6b
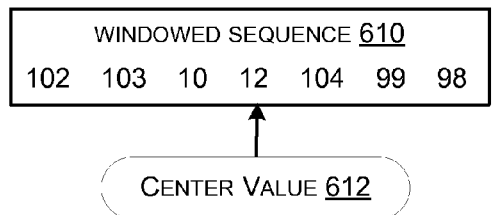
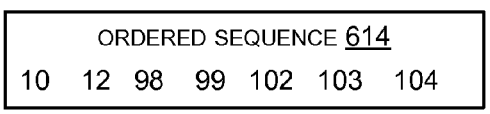
Fig. 6c

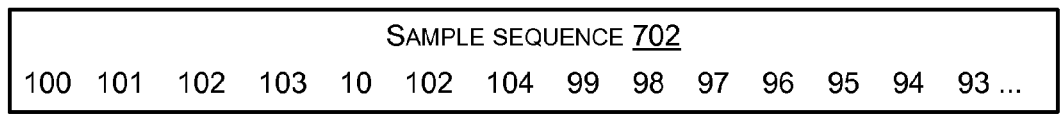
Fig. 7a
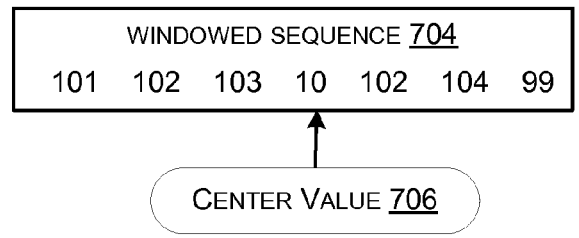
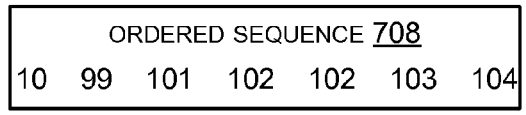
Fig. 7b

| ORDERED SEQUENCE 814 (CENTER PIXEL 804) |
|---|
| A A A A A A A A A A A A A A A A A A A 251 252 252 253 254 |

| ORDERED SEQUENCE 816 (CENTER PIXEL 806) |
|---|
| A A A A A A A A A A A A A A A A A A A A 251 252 252 253 |

| ORDERED SEQUENCE 818 (CENTER PIXEL 808) |
|---|
| A A A A A A A A A A A A A A A A A A A A A 251 252  253 |

| ORDERED SEQUENCE 820 (CENTER PIXEL 810) |
|---|
| A A A A A A A A A A A A A A A A A A A A 251 252  253 254 |

| ORDERED SEQUENCE 822 (CENTER PIXEL 812) |
|---|
| A A A A A A A A A A A A A A A A A A A A 251 252  254 |

ORDERED SEQUENCE 1006 (CENTER PIXEL 1004)
A A A A A A A A A A A A A A A A A A A A A A A A 251

METHOD AND APPARATUS FOR REDUCING NOISE IN A SCANNED IMAGE WHILE MINIMIZING LOSS OF DETAIL IN THE SCANNED IMAGE

CROSS REFERENCE TO RELATED APPLICATIONS

The present disclosure claims priority to U.S. Patent Application No. 61/566,381, filed on Dec. 2, 2011, which is incorporated herein by reference.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

An optical image scanner typically includes scanning hardware (i.e., contact image sensors) that transfers data of a source image scanned by the optical image scanner to a processor and/or controller, wherein the processor and/or controller creates an image (a scanned image) based on the data. With the industry trend toward lowering hardware and manufacturing costs, optical image scanners often employ sensors having a lower signal-to-noise ratio (SNR), lighting that provides a lower output (e.g., dimmer lighting), and less expensive cabling (e.g., unshielded cabling).

Using both lower output lighting and sensors having a lower SNR to scan images commonly result in scanned images that include noise. This noise in a scanned image is often referred to as random noise, white noise, Gaussian noise, or the like. Low pass filtering is commonly used to reduce the level of noise in a scanned image. However, a disadvantage of this approach is that basic low pass filtering generally causes blurring of fine detail in images.

Many optical image scanners use a scanning mechanism driven by a motor in which a sensor or sensor array is sequentially moved or passed over adjacent lines of a source image. As the sensor moves across the source image, the sensor transmits data in the form of a serial sequence of scanned color and/or brightness values (referred to herein as "scanned values"). The scanned values are commonly analog values sampled and transmitted at a relatively high frequency. Because of design and packaging constraints, a processor and/or controller that controls the motor and processes the scanned values may be located at a significant distance from the scanning hardware. Coupled with the lack of cable shielding, this creates the potential for switching currents and voltages in nearby circuits, such as control signals for the motor, to distort portions of analog signals from the sensor before the portions of analog signals reach the processor and/or controller. This often gives rise to what is commonly referred to as "salt and pepper" noise, which appears as distributions of very bright or very dark pixels on portions of a scanned image.

Median filtering (e.g., a nonlinear digital filtering technique of replacing entries with a median of neighboring entries) is commonly used to reduce the salt and pepper noise. However, a disadvantage of this approach is that basic median filtering also causes blurring of fine detail in images and can even make fine lines go away.

SUMMARY

In various embodiments, the present disclosure provides a method of filtering noise in an image in order to minimize a loss of detail in the image, the method comprising determining a plurality of samples of the image that fall within a first sliding window at a first point in time, where values of the samples in the first sliding window are also determined. Samples that have values that are within a tolerance of a value of a sample that is centered within the first sliding window are determined. Based at least in part on (i) the value of the sample that is centered within the first sliding window and (ii) the values of the samples of the image that are within the tolerance of the value of the sample that is centered within the first sliding window, the value of the sample that is centered within in the first sliding window is normalized. The present disclosure also provides a method of filtering noise comprising determining values of samples of an image that fall within a sliding window (e.g., 2-dimensional sliding window) at a first point in time, wherein the samples of the image within the sliding window include a sample that is centered within the sliding window at the first point in time. Values of the samples in the sliding window are sorted into a sorted array. Three distinct regions of the sorted array are defined, where each of the distinct regions has multiple values of the samples. A mapped value associated with the sample that is centered within the sliding window is assigned based at least in part on which of the three distinct regions within which a value of the sample that is centered within the sliding window is located in the sorted array. While minimizing a loss of detail in the image, salt and pepper noise is filtered from the image.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4 is a diagram illustrating a method of low pass filtering to reduce noise while maintaining image detail.

FIGS. 6a-6c are diagrams illustrating an example method of 1-Dimensional window filtering to reduce salt and pepper noise.

FIGS. 7a and 7b are diagrams illustrating an example method of 1-Dimensional window filtering to reduce salt and pepper noise.

DETAILED DESCRIPTION

The present disclosure describes image processing techniques for reducing noise in a scanned image with a minimal loss of detail that does not rely on having to evaluate the whole source image. In one embodiment, filtering techniques are described for removing noise, such as Gaussian noise, from a scanned image, that minimizes the blurring or loss of detail that occurs with the use of conventional low pass filtering (LPF) techniques. In another embodiment, filtering techniques are described for removing noise, such as "salt and pepper" noise, from a scanned image, the minimizes the blurring or loss of fine detail that occurs with the use of conventional median filtering (MF) techniques.

Figure 1:
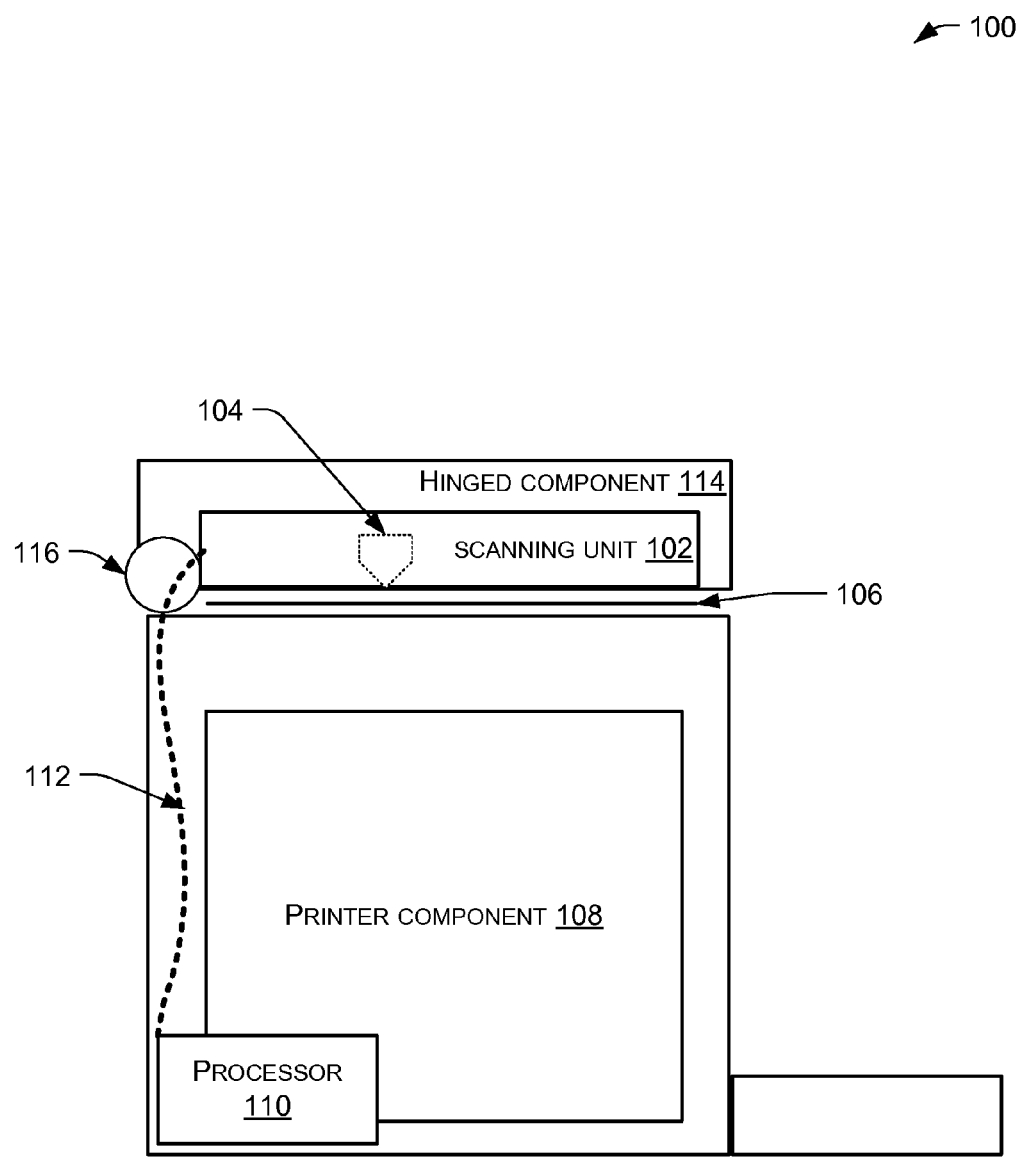
FIG. 1 is a simplified representation of an image scanning device that also includes printing capabilities.

FIG. 1 illustrates an image scanner 100 (e.g., an optical image scanner) in accordance with various embodiments of the present disclosure. Image scanner 100 may be integrated with a printer mechanism and/or other components to form what has become known as a multi-function printer (MFP). In other embodiments, image scanner 100 may comprise a stand-alone scanner. Image scanner 100 generally includes a flatbed scanner or an automatic document feed (ADF) scanner. Furthermore, certain embodiments may comprise components or sub-components of an image scanner.

In the configuration illustrated by FIG. 1, the image scanner 100 100 has a scanning unit 102 that performs source image scanning functions. The scanning unit 102 has one or more optical sensors, sensor assemblies, contact image sensors or other scanning elements illustrated by scanning element 104, which may comprise charge-coupled devices (CCDs) or other types of optical sensing devices.

In the illustrated embodiment, a medium 106, such as a sheet of paper, contains a source image. The medium 106 may be positioned above, below, or otherwise adjacent to scanning element 104. Scanning element 104 may be configured to perform sequential scanning or sensing passes over the source image located on the medium 106. For example, the scanning unit 102 may have a transport mechanism (not shown) configured to move or pass scanning element 104 across a horizontal line of the medium 106 so that sensors of scanning element 104 may sample individual locations or pixels along the line. In addition, either the medium 106 or the transport mechanism of the scanning unit 102 may be moved so that each pass of scanning element 104 is of a different line of the source image.

Thus, scanning unit 102 performs scanning passes of sequential image lines, each line of which comprises samples of multiple pixels of a source image on the medium 106. Within each line, data is output from scanning unit 102 as a series or sequence of samples of pixel values (e.g., analog sample values). The sequence of samples of pixel values may correspond to physical movement of scanning element 104 across the medium 106, or may correspond to serial output characteristics of scanning element 104 associated with movement of medium 106 across scanning element 104.

As noted above, image scanning devices may have integrated functionality in addition to scanning functionality. The image scanner 100 is illustrated in FIG. 1 as incorporating a printer component 108. Printer component 108 may share certain aspects of its operation with scanning unit 102. For example, printer component 108 may have paper handling capabilities and mechanisms that are shared with scanning unit 102 and the paper handling mechanisms may be used to automatically feed document sheets through or past scanning unit 102.

The scanning device of FIG. 1 is illustrated as incorporating a processor 110 that is configured to control the operation of the scanning unit 102, process data from scanning unit 102 and optionally control other integrated functionality such as the printer component 108. Processor 110 is also configured to receive scanning data (e.g., sample values) from the scanning unit 102 and its scanning element 104. Processor 110 may also perform other functions, such as processing samples of pixel values from scanning element 104, communicating with external devices and interacting with users.

Because of design and packaging constraints, and the integration of multiple components within a single device, processor 110 may be at some distance from the scanning unit 102. In the embodiment of FIG. 1, for example, processor 110 is positioned at the bottom of the image scanner 100, and a communications bus or cable 112 extends within the image scanner 100 between processor 110 and the scanning unit 102. Cable 112 carries or conveys multiple signals, including data and control signals. These signals may include scanned data signals, clock signals, synchronization signals, motor control signals, and so forth. For example, cable 112 may convey scanned pixel data from scanning element 104 to processor 110.

Cable 112 may be relatively long, because of the physical distance between processor 110 and the scanning unit 102. Additionally, physical complexities and details of the image scanner 100 may in some cases necessitate complex routing of the cable 112, which may require further increases to a length of cable 112. In the illustrated embodiment, for example, the image scanner 100 includes a hinged upper component 114, and wires in cable 112 that connect to motor 116. In an embodiment, such as a flatbed scanner, cable 112 is connected to scanning element 104 (e.g., contact image sensor(s)) and optionally to motor 116 to control movement of scanning element 104 back and forth across scanning unit 102 for scanning a source image on media 106. In another embodiment, such as an ADF scanner, cable 112 is connected to motor 116 to control movement of media 106 across scanning element 104 for scanning a source image on media 106.

Different devices may of course be implemented in different ways, and may have different physical configurations. The device shown in FIG. 1 is merely an example of one possible implementation, serving to illustrate the constraints that can be raised by integration of multiple functions and capabilities in a single device.

Scanner Processing and Control

Figure 2:
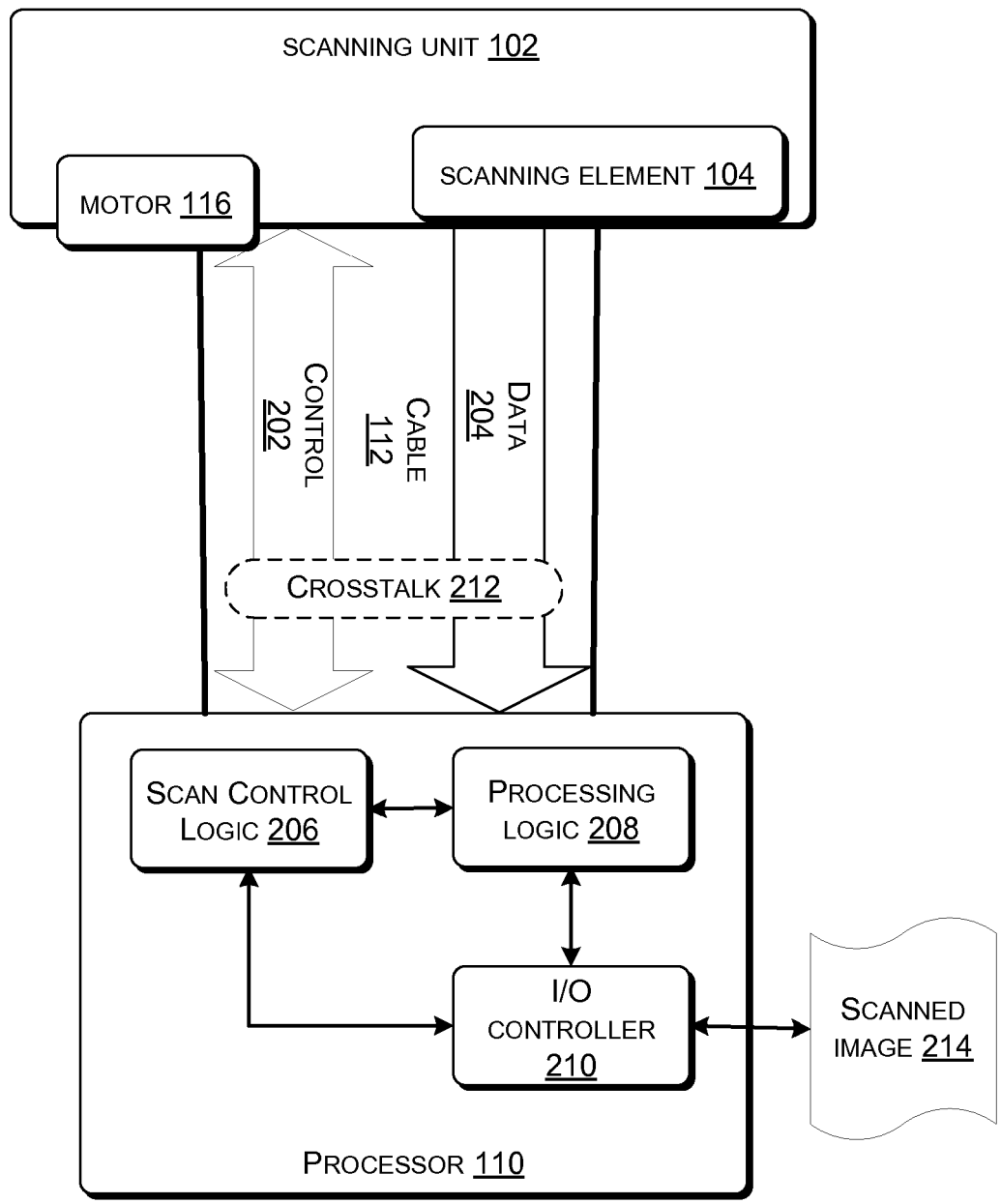
FIG. 2 is a block diagram showing relevant elements of the image scanning device of FIG. 1.

FIG. 2 is a schematic diagram of an example architecture 200 which illustrates further details regarding scanning unit 102, cable 112 and processor 110. Communications between the processor 110 and the scanning unit 102 take place through the communications bus or cable 112, which in the illustrated example includes control bus 202 and data bus 204. In an embodiment, cable 112 comprises a flexible flat cable (FFC) which includes a variety of electrical cable that is both flat and flexible having multiple metallic conductors (e.g., wires).

Control bus 202 generally includes various control signals, such as clock signals, clocking synchronization signals, scanning unit 102 control signals, scanning element 104 control signals, and the like. Additionally, control bus 202 may optionally include motor control signals for controlling motor 116. Motor control signals generally include noisy analog signals subject to transient spiking during control of motor 116. Control bus 202 generally interfaces with scan control logic 206 for transmitting, receiving and processing of various control signals to facilitate a scanning process. In an aspect, control bus 204 is configured as a subset of multiple metallic conductors of cable 112, such that each metallic conductor of the subset carries one or more of the various control signals.

Data bus 204 is used to interface scanning unit 102 to processing logic 208. Data bus 204 provides samples (e.g., analog samples) from one or more sensors of scanning element 104 to processing logic 208 during a scanning process. In an embodiment, processing logic 208 contains an analog-to-digital converter (not shown) to convert analog samples received on data bus 204 to binary values to facilitate digital signal processing of the binary value representations of the analog samples. These samples represent pixel values obtained from scanning a source image on media 106. A source image on media 106 contains text of one or more sizes, one or more images of various sizes, and/or the like. For simplicity, the content on media 106 will be referred to herein as a source image. The source image on media 106 may be black and white, gray scaled and/or color of a broad spectrum of tones. As part of a scanning process, sensors of scanning element 104 provide a serial sequence of samples across data bus 204 to processing logic 208. The sensors of scanning element 104 provide a sequence of samples of pixel values representative of a red-green-blue (RGB) color detected on a source image on media 106. In an aspect, data bus 204 is configured as a subset of multiple metallic conductors of cable 112, such that each metallic conductor carries a serial stream of samples from sensors of scanning element 104 obtained during a scanning process.

Processing logic 208 is generally configured to process samples of pixel values received via data bus 204. In an embodiment, processing logic 208 is configured as a part of an application-specific integrated circuit (ASIC) that includes a processor and memory (not shown). Processing logic 208 is generally configured to process samples of pixel values sequentially received on individual lines (e.g., metallic conductors) of cable 112. Processing logic 208 is generally also configured to process blocks of samples associated with blocks of pixels of a source image on media 106. Processing logic 208 may be configured to process sequences and blocks of individual RGB samples received from scanning element 104, and/or convert RGB samples into a different color space for processing. As an example, processing logic 208 may encode individual RGB samples into one or more of a family of YCC color spaces for processing of luminance or luma components, or individual processing of luminance or luma components, blue-difference components and/or red-difference components.

I/O controller 210 is configured to provide various forms of input and output for processor 110, as well as scan control logic 206. As an example, I/O controller 210 may provide processed samples of scanned image 214 from a source image on media 106 from processing logic 208 to printer component 108 for printing, or provide a data file of scanned image 214 for access by a user via a user access port or interface (not shown). Additionally, I/O controller 210 may provide access by a program, user and/or programmer for configuring parameters and structuring processing configurations in processing logic 208, as well as scan control logic 206.

As part of an industry trend to reduce hardware and manufacturing costs of scanning devices, a number of cost cutting measures are commonly implemented. As an example, less expensive cabling 112 is commonly used that has little or no shielding between the multiple metallic conductors. This lack of shielding may result in increased crosstalk 212 between metallic conductors of cable 112 or induced crosstalk from sources external to cable 112 due to, for example, noise from external interferences, such as switching currents and voltages in nearby circuits or present on other metallic conductors of cable 112. Crosstalk 212 may affect analog values of various samples on data bus 204, causing noise and other undesirable artifacts to appear on scanned images. Crosstalk 212 may exist between metallic conductors of cable 112 associated with analog signals on data bus 204. Additionally, crosstalk 212 may exist between metallic conductors of control bus 202 and metallic conductors of data bus 204 that may more significantly affect samples on data bus 204.

As an example, control bus 202 includes analog motor control signals (e.g., pulse width modulated signals) for controlling motor 116. In the case of a flatbed scanner, motor 116 controls movement of scanning element 104 back and forth during a process of scanning a source image on media 106. Irregularities in a transport mechanism (not shown) used to guide scanning element 104 as it is moved by motor 116, including normal wear and tear, may result in numerous transient spikes or other transitions on one or more metallic conductors of cable 112 used to carry motor control signals. Additionally, numerous transient spikes or other transitions may occur when scanning element 104 changes directions as it scans back and forth across media 106, or when motor 116 is simply turned on and off. These transient spikes or other transitions often appear as crosstalk 212, affecting samples on data bus 204. This type of crosstalk 212 may result in artifacts appearing on scanned image 214. As an example, one type of artifact is referred to as "salt and pepper" noise, which may manifest as distributed outlier light and dark pixel values on scanned image 214.

As another example, to further reduce hardware and manufacturing costs, scanning sensors (e.g., contact image sensors), such as sensors of scanning element 104, are used that output analog signals and may have a relatively low signal-to-noise ratio (SNR), or subject to relatively more rapid SNR degradation over time or based on usage. Additionally, dimmer lighting may also be used to reduce hardware and manufacturing costs, further impacting a sensor's SNR. Therefore, samples transmitted by sensors in scanning element 104 to processing logic 208 may be corrupted by noise that may be attributable to a low SNR of sensors. This type of noise may be characterized as Gaussian noise, white Gaussian noise, random noise or simply referred to as white noise, or the like.

In an embodiment, processing logic 208 is configured to perform various types of filtering of samples received over data bus 204. To combat the effects of white noise, low pass filtering (LPF) is often employed. To combat the effects of salt and pepper noise, median filtering is often employed. Low pass and median filtering may effectively combat many effects of salt and pepper and white noise on scanned image 214, however, reduction of noise using these filters may reduce details in scanned image 214.

Noise Reduction Using Low Pass Filtering with Loss of Detail

Figure 3:
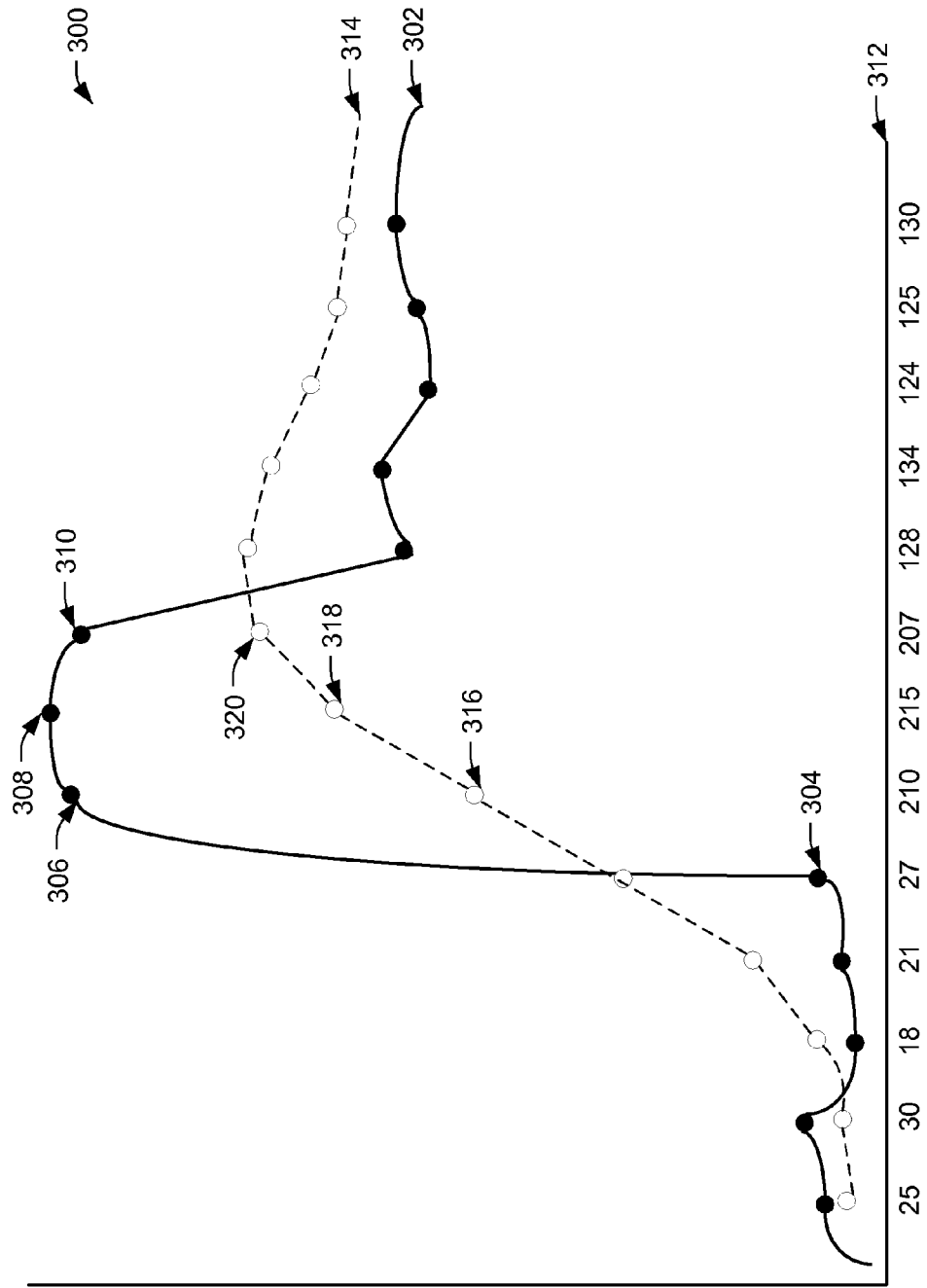
FIG. 3 is a diagram illustrating a method of low pass filtering to reduce noise.

FIG. 3 illustrates an example environment 300 of filtering samples using a conventional form of low pass filtering. Solid curve 302 illustrates an example distribution of an example sequence of samples, represented by black dots, as illustrated in part by black dots 304-310. Samples are illustrated as having values between 0-255. Such samples may have been sequentially provided by a contact sensor of scanning element 104 to processing logic 208 via cable 112. As an example, the samples may have been provided to processing logic 208 as RGB outputs of a sensor of scanning element 104 over one or more metallic conductors of cable 112.

The numbers below horizontal axis 312 represent sample values of the sequence of samples represented by the black dot vertically aligned above the sample value. Thus, the left-most dot on curve 302 represents a sample received at processing logic 208 having a value of 25. The next dot to the right on curve 302 has a sample value of 30, followed by a dot with a sample value of 18, followed by a dot with a sample value of 21. The next dot, dot 304, has a sample value of 27, followed by a sample value of 210 for dot 306. The large transition in sample values between dot 304 and dot 306 is meant to represent an actual desired transition found on a source image on media 106. As an example, this large transition may represent an edge of a text character, or other actual edge found on a source image on media 106. This edge persists on the source image on media 106, as indicated by dot 308 having a sample value of 215 and the next dot 310 having a sample value of 207.

Dashed curve 314 represents example sample values after low pass filtering is applied to the samples of solid curve 302, as represented in part by white dots 316-320 along dashed curve 314. Therefore, dashed curve 314 represents a low pass filtered version of solid curve 302. Thus, in this example, white dots 316-320 correspond to black dots 306-310, respectively, after low pass filtering is applied to sample values on solid curve 302.

Dashed curve 314 illustrates a smoothed version of solid curve 302, as attributed to the low pass filtering. However, the low pass filtering has caused an undesirable effect: namely, blurring the desired sharp transition illustrated between samples 304-310. Thus, in this example illustration, noise reduction using low pass filtering has resulted in a significant loss of detail in scanned image 214.

Noise Reduction Using Filtering with Minimal Loss of Detail

FIG. 4 illustrates an example environment 400 of filtering samples using filtering with minimal loss of detail. Solid curve 302 illustrates the distribution of sample values, with corresponding sample values shown under horizontal axis 312, as described with regard to FIG. 3. Dashed curve 402 represents corresponding sample values after filtering with minimal loss of detail is applied to the samples on curve 302, as represented by white dots, such as white dots 404-410, along dashed curve 402. Therefore, dashed curve 402 represents a filtered version of solid curve 302. Thus, in this example, white dots 404-406 correspond to black dots 304-310, respectively, after filtering with minimal loss of detail is applied to sample values on solid curve 302.

Dashed curve 402 illustrates a smoothed version of solid curve 302, as attributed to the filtering with minimal loss of detail. However, the filtering with minimal loss of detail has not caused the undesirable effect of blurring the desired sharp transition illustrated between samples 304-310. Thus, noise reduction using filtering with minimal loss of detail has not resulted in a significant loss of detail in scanned image 214.

In an embodiment, a sliding filter window, such as filter window 412, is used to implement filtering with minimal loss of detail. As an example, filter window 412 may be a simple 1×7 sliding window that performs equal weighting of samples by comparing the windowed six samples surrounding a center sample to the center sample's value, and selecting those samples that are within a tolerance to be included in an average. In FIG. 4, filter window 412 is shown centered at sample value 21, surrounded by sample values 25, 30 and 18 on the left, and sample values 27, 210 and 215 on the right. In an embodiment, an example filtering method includes the following:

1. Determine how many samples in filter window 412 have similar values to the center pixel within a specific tolerance.
2. Sum up all of the pixels within the specific tolerance including the center pixel.
3. Normalize the sum by the number of pixels found including the center pixel.

FIG. 4 illustrates an example sequence of samples shown under horizontal axis 312 as 25, 30, 18, 21, 27, 210, 215, 207, 128, 134, 124, 125 and 130. As an example, a tolerance of +/−10 is selected and used with filter window 412 to window (e.g., apply a windowing function using filter window 412), at a first point in time, the first seven entries that include:

25, 30, 18, 21, 27, 210, 215

The center sample value (e.g., sample that is centered within filter window 412) "21" is shown as bold. The sample values within the selected tolerance of +/−10 include:

25, 30, 18, 21, 27

These sample values within tolerance may be summed (i.e., 121) and divided by the number of sample values (i.e., 5) within tolerance to yield an average value of 24.2. Thus, the filtering may map sample 412 with a sample value of 24.

Continuing with this example, at a second point in time, filter window 412 slides to center the next sample value of 27 corresponding to sample 304, where the next seven entries include:

30, 18, 21, 27, 210, 215, 207

In this example, the selected tolerance is still +/−10. The sample values within the selected tolerance include:

30, 18, 21, 27

The average value is 24, so as part of this filtering, sample value 404 is mapped to a value of 24. Stated another way, the value 24 is mapped to sample value 304 via sample 404.

Continuing with this example, at a third point in time, filter window 412 slides to center the next sample value of 210 corresponding to sample 306, where the next seven entries windowed by sliding window 412 include:

18, 21, 27, 210, 215, 207, 128

In this example, the selected tolerance is still +/−10. The sample values within the selected tolerance include:

210, 215, 207

The average value is 210.666, so as part of this filtering, sample 406 is mapped to a value of 211.

Filter window 412 slides, at a fourth point in time, to center the next sample value of 215 corresponding to sample 308, where the next seven entries include:

21, 27, 210, 215, 207, 128, 134

In this example, the selected tolerance is still +/−10. The sample values within the selected tolerance include:

210, 215, 207

The average value is 210.666, so as part of this filtering, sample value 408 is set to 211.

Filter window 412 slides, at a fifth point in time, to center the next sample value of 207 corresponding to sample 310, where the next seven entries include:

27, 210, 215, 207, 128, 134, 124

In this example, the selected tolerance is still +/−10. The sample values within the selected tolerance include:

210, 215, 207

The average value is 210.666, so as part of this filtering, sample value 410 is set to 211.

Filter window 412 slides, at a sixth point in time, to center the next sample value of 128, where the next seven entries include:

210, 215, 207, 128, 134, 124, 125

In this example, the selected tolerance is still +/−10. The sample values within the selected tolerance include:

128, 134, 124, 125

The average value is 127.75, so as part of this filtering, the corresponding sample value on curve 402 is set to 128.

Filter window 412 slides, at a seventh point in time, to center the next sample value of 134, where the next seven entries include:

215, 207, 128, 134, 124, 125, 130

In this example, the selected tolerance is still +/−10. The sample values within the selected tolerance include:

128, 134, 124, 125, 130

The average value is 128.2, so as part of this filtering, the corresponding sample value on curve 402 is set to 128.

The example filtering technique presented above illustrates using a 1-dimensional (1-D) 1×7 sliding window that performs equal weighting of samples, and a constant selected tolerance of +/−10. The 1-D sliding window facilitates simple processing of a sequence of samples (e.g., raster samples) from an output of a sensor of scanning element 104. Processing logic 208 may be configured to effectively process numerous sensor outputs in parallel. In an embodiment, processing logic 208 may be configured to process all sensor outputs in parallel using an appropriate number of multiple 1-D sliding windows. In an alternate embodiment, processing logic 208 may be configured to serialize all, or a portion of sensor output sequences using serial processing (e.g., multiplexing), parallel processing, or combinations of both serial and parallel processing of sample sequences.

Processing logic 208 may be configured to use numerous other sliding window sizes, filter distribution functions, and selected tolerance values. As an example, a 1-D sliding window may be selected of size 1×9 or 1×N, where N is a positive integer greater than 1. Additionally, any filter distribution function may be selected. As an example, a sliding window may be selected as a Gaussian like filter, or other weighted filter, that weights sample values within the selected tolerance differently based on a distance between the center sample and each sample value within the selected tolerance.

In an alternate embodiment, the sliding window may be 2-D of size N×N or N×M (i.e., N and M integers greater than 1), using any filter distribution function. In yet another embodiment, a 2-D sliding box window may be emulated by sliding a first 1-D window in a first dimension across samples of a source image, and sliding a second 1-D window in a second dimension across samples of the source image. As an example, a 1-D window (e.g., 1×7, 1×9, etc.) may be used across a horizontal direction to perform the filtering within the selected tolerance described herein, and a 1-D window (e.g., 7×1, 9×1, etc.) may be used across a vertical direction to perform the filtering within the selected tolerance described herein.

In the example above, a constant selected tolerance range of +/−10 was used. However, a different amount of noise, and/or a different percentage of noise may occur at different sample value levels. Therefore, processing logic 208 may be configured to use different or variable tolerance ranges depending on sample value levels. In an embodiment, processing logic 208 may be configured to use a look-up table, function or other data file, to vary tolerance ranges at various window locations. As an example, tolerance ranges may vary as a function of sample value magnitudes. In an aspect, a tolerance range may be selected as a function of a center sample value. Thus, in an aspect, tolerance ranges may be selected that are tone dependent. In another aspect, tolerance ranges may be selected based on noise characteristics of a sensor. As an example, if a sensor exhibits more noise for sample values in the range of 20-75 and 90-143, then tolerance ranges may be selected in these tone ranges that best mitigate noise associated with a specific sensor. Thus, tolerance values may be provided that are sensor specific, such that processing logic 208 may select tolerance values that are level and/or sensor specific as part of processing samples.

Noise Reduction Using Median Filtering with Loss of Detail

Salt and pepper noise is a form of noise typically seen on scanned images often as randomly occurring white and black pixels. A noise reduction method for this type of noise commonly involves using a median filter. Salt and pepper noise creeps into scanned images in situations where quick transients, such as switching currents and voltages in nearby circuits, take place. As discussed herein, a median filter reduces fine detail in a scanned image, and may even totally remove fine lines that present in the source image.

The main idea of the median filter is to run through the signal entry by entry, replacing each entry with the median of neighboring entries. The pattern of neighbors is called the "window", which slides, entry by entry, over the entire signal. For 1-D signals, the most obvious window is just the first few preceding and following entries. A 2-D (or higher-dimensional) window may also be used, as well as more complex window patterns. Note that if the window has an odd number of entries, then the median is simple to define: it is just the middle value after all the entries in the window are sorted numerically.

Figure 5A:
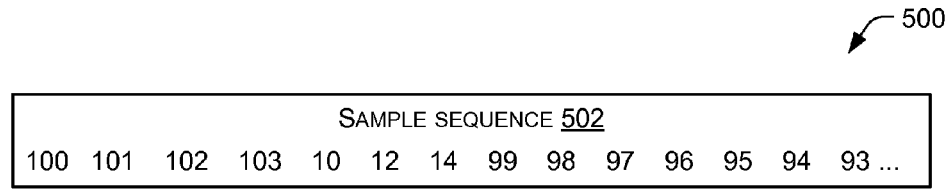
FIGS. 5a-5e are diagrams illustrating an example method of 1-Dimensional window filtering to reduce salt and pepper noise.

FIGS. 5a-5e illustrate example environment 500 of filtering the 1-D sequence of samples with a 1-D siding window. FIG. 5a illustrates an example 1-D sequence of samples in sample sequence 502 for filtering with a 1×7 sliding window.

Figures 5B, 5C:
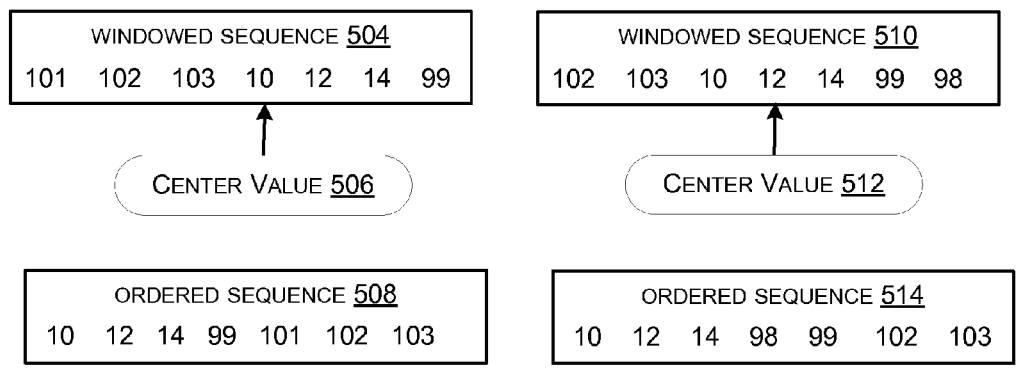

As an example of median filtering, FIG. 5b illustrates the 1×7 sliding window encompassing windowed sequence 504 centered at center value 506, which corresponds with sample value 10 in sample sequence 502. The value 10 at center value 506 is the value to be filtered by median filtering. Ordered sequence 508 shows the windowed values in windowed sequence 504 ordered from smallest to largest sample values. In an alternate aspect, samples may be ordered from largest to smallest. The middle value in sorted array 508 is 99. Thus, the sample value 10 at center value 506 is mapped to the median value of 99 as part of median filtering.

FIG. 5c shows windowed sequence 510, windowed by sliding the 1×7 window one sample to the right in sample sequence 502. The value 12 at center value 512 is the value to be filtered by median filtering. Ordered sequence 514 shows a sorted array of windowed values in windowed sequence 510. The median value in ordered sequence 514 is 98. Thus, the sample value 12 at center value 512 is mapped to the median value of 98 as part of median filtering.

Figures 5D, 5E:
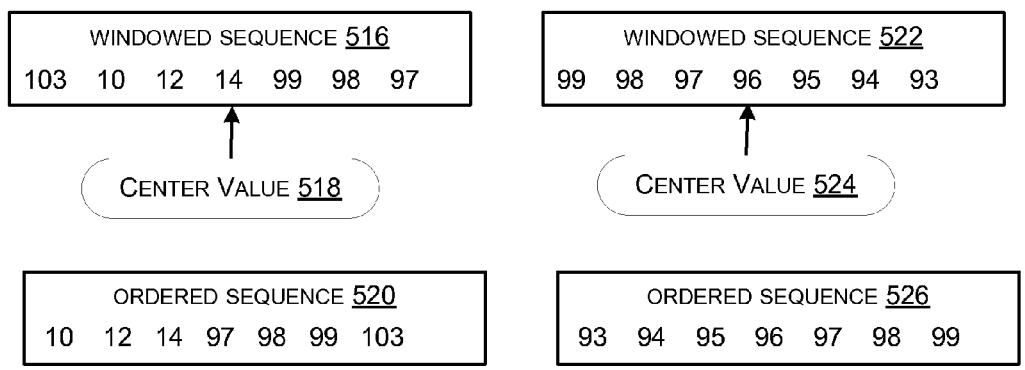

FIG. 5d shows windowed sequence 516, windowed by sliding the 1×7 window one sample to the right in sample sequence 502. The value 14 at center value 518 is the value to be filtered by median filtering. Ordered sequence 520 shows the windowed values in windowed sequence 516 sorted from smallest to largest sample values. The median value in sorted array 520 is 97. Thus, the sample value 14 at center value 518 is mapped to the median value of 97.

As shown in FIGS. 5b-5d, median filtering has filtered three low valued samples of other relatively high valued samples in sample sequence 502 by replacing them with relatively high valued samples. If the sample values 10, 12 and 14, represented by center values 506, 512 and 518, respectively, had actually represented a fine detail of a source image, such as a 3-pixel wide fine line or other fine detail, then median filtering would actually remove this fine detail from the filtered image.

Continuing with this example of median filtering, FIG. 5e shows windowed sequence 522, windowed by sliding the 1×7 window four samples to the right in sample sequence 502. The value 96 at center value 524 is the value to be filtered by median filtering. Ordered sequence 526 shows the windowed values in windowed sequence 522. The median value in ordered sequence 526 is 96. Thus, the sample value 96 at center value 524 is mapped to the median value of 96. Regarding median filtering to remove salt and pepper noise, in view of sample sequence 502, this filtering step was not required to facilitate filtering of salt and pepper noise.

Note that FIG. 5b-e show only a portion of the filtering that would occur with median filtering, as every pixel value would be processed using this median filtering process.

Salt and Pepper Filtering with Minimal Loss of Detail

As an alternative to, or an extension of, median filtering, instead of using a median type filter which will severely reduce the spatial details of the scanned image, techniques described herein limit the pixel of interest to a function of the values of the surrounding pixels.

As an example, returning to FIG. 5b, the center pixel (e.g., sample centered within sliding window 412 at a first point in time) value 10 at center value 506 is on the left edge of ordered sequence 508. A parameter, such as $D_L$, is specified for the left edge of sorted array 508 that indicates a number of values to the right of the left edge used to "clamp" values around the left edge of the sorted array. As an example, if $D_L=2$, then in sorted array 508, the $2^{nd}$ value to the right of the left edge is 12. Therefore, the value 10 of center value 506 is within the region of the left clamp, and is mapped to the clamped value of 12. If $D_L=3$, then in ordered sequence 508, the $3^{rd}$ value to the right of the left edge is 14, and center value 506 is within the region of the left clamp, and is mapped to the clamped value of 14.

Likewise, a parameter such as $D_R$ is specified for the right edge of sorted array 508 that indicates a number of values to the left of the right edge used to "clamp" values of the sorted array. As an example, if $D_R=2$, then the $2^{nd}$ value to the left of the right edge is 102.

Thus, if the value 103 on the right edge were the center pixel, it is within the region of the right clamp, and is mapped to the clamped value of 102. If $D_R=3$, then the $3^{rd}$ value to the left of the right edge of sorted array 508 is 101. Thus, if the value 103 on the right edge of sorted array 508 were the center pixel, it is within the region of the right clamp, and is mapped to the clamped value of 101.

Thus, for each sorted array having $D_L$ and $D_R$ so specified, center pixels between pixels associated with $D_L$ and $D_R$ are unchanged by the enhanced filtering method described herein. Conversely, median filtering processes all pixels to find their median value.

In an aspect, $D_L$ and $D_R$ are not required to be equal. As an example, $D_L$ and $D_R$ each change as a function of one or more pixel values in each sorted array of pixel values. Additionally, values of $D_L$ and $D_R$ are user configurable in processing logic 208. As an example, a user provides a look-up table to processing logic 208 for setting values of $D_L$ and $D_R$ as a function of one or more pixel values in each sorted array of pixel values.

In FIG. 5c, if $D_L=2$, the pixel (e.g., sample centered within sliding window 412 at a second point in time) associated with center value 512 is mapped to the clamping value of 12. If $D_L=3$, the pixel associated with center value 512 is mapped to the clamping value of 14. In FIG. 5d, if $D_L=2$, the pixel associated with center value 512 is mapped to the clamping value of 12. If $D_L=3$, the pixel associated with center value 512 is mapped to the clamping value of 14.

In FIG. 5e, if $D_R=2$, the clamping value in ordered sequence 526 is 98. If $D_R=3$, the clamping value in ordered sequence 526 is 97. If $D_L=2$, the clamping value in ordered sequence 526 is 94. If $D_L=3$, the clamping value in ordered sequence 526 is 95. Since the pixel value of 96 associated with center value 524 is between values associated with $D_L$ and $D_R$, it remains unchanged and is mapped to its current value of 96 because it exists in a region of sorted array 526 that is a middle region between left and right regions defined by $D_L$ and $D_R$, respectively. Thus, with $D_L$ and $D_R$ specified, three distinct contiguous regions are defined in a sorted array, such that a value is mapped to a center value as a function of which region the center value is located in the sorted array.

Thus, as an example, using a simple 1-D 1×7 window with a simple averaging filter function, for $D_L=D_R=2$, the associated sequence segment [100, 101, 102, 103, 10, 12, 14, 99, 98, 97, 96, 95, 94, 93] of sample sequence 502 may be expressed as:

[102, 12, 12, 14, 98, 98, 97, 96]

Notice that this enhanced filtering preserved the 3 pixel wide edge characteristic (i.e., [12, 12, 14]) of the scanned image, while median filtering using the same 1-D 1×7 window did not.

FIGS. 6a-6c illustrate example environment 600 of filtering the 1-D sequence of samples, shown as an example sample sequence 602, with a 1×7 siding window. Note that sample values [10, 12] in sample sequence 602 may represent a 2-pixel wide edge or line detail of a source image that may be desired to be preserved after filtering.

FIG. 6b illustrates the 1×7 sliding window encompassing windowed sequence 604, at a first point in time, centered at center value 606, which corresponds with sample value 10 in sample sequence 602. Ordered sequence 608 shows the windowed values in windowed sequence 604.

Using median filtering, the sample value 10 at center value 606 is mapped to the median value of 101 as part of median filtering. However, using the filtering with minimal loss of detail described herein, with $D_L=2$, the sample value 10 at center value 606 is mapped to a value of 12, thus preserving fine detail in sequence 602.

FIG. 6c shows windowed sequence 610, windowed by sliding the 1×7 window, at a second point in time, one sample to the right in sample sequence 602. The value 12 at center value 612 is the value to be filtered by median filtering. Ordered sequence 614 shows the windowed values in windowed sequence 610 ordered from smallest to largest sample values.

Using median filtering, the sample value 12 at center value 612 is mapped to the median value of 99 as part of median filtering. However, using the filtering with minimal loss of detail described herein, with $D_L=2$, the sample value 12 at center value 612 is mapped to a value of 12, thus preserving fine detail in sequence 602, even for an edge or line of 2 pixel widths.

FIGS. 7a and 7b illustrate example environment 700 of filtering the 1-D sequence of samples, shown as sample sequence 702, with a 1×7 siding window.

FIG. 7b illustrates the 1×7 sliding window encompassing windowed sequence 704 centered at center value 706, which corresponds with sample value 10 in sample sequence 702. Notice that the values surrounding center value 706 are relatively large, indicating that at least in 1-D, center value 706 may be attributed to salt and pepper noise. However, since only 1-D filtering is applied, it is possible that center value 706 might be a portion of fine detail in a 2-D source image. Ordered sequence 708 shows the windowed values in windowed sequence 704 ordered from smallest to largest sample values.

Using median filtering, the sample value 10 at center value 706 is mapped to the median value of 102 as part of median filtering. Using the filtering with minimal loss of detail described herein, with $D_L=2$, the sample value 10 at center value 706 is mapped to the next largest value (e.g., clamped to the $2^{nd}$ value from the left edge) and mapped to 99, thus providing filtering results similar to that of the median filter to reduce salt and pepper noise.

Figures 8A, 8B:
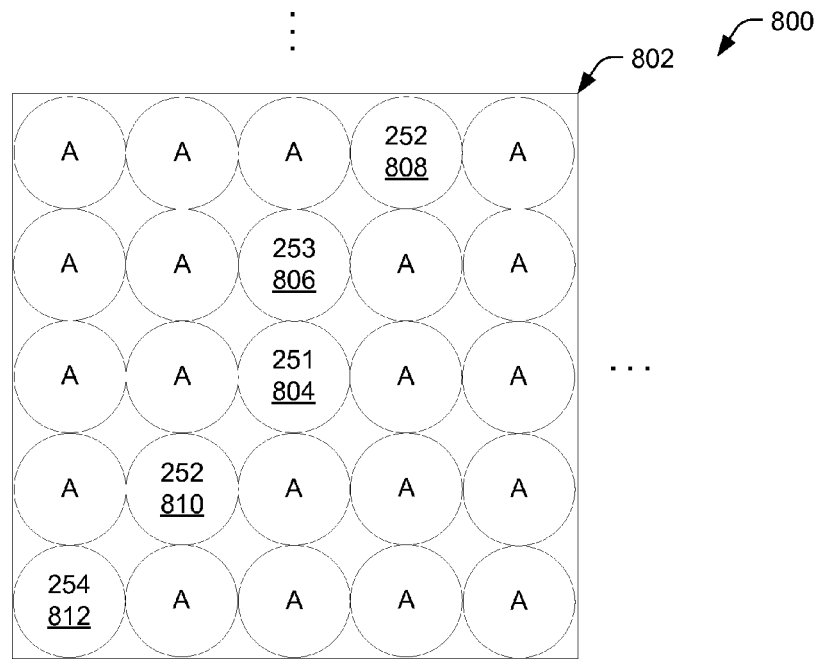
FIGS. 8a and 8b are diagrams illustrating an example method of 2-Dimensional window filtering to reduce salt and pepper noise.

FIGS. 8a and 8b illustrate example environment 800 of filtering using a 2-D sliding window. FIG. 8a illustrates an example of filtering samples (e.g., pixels) of a source image using 5×5 siding window 802 at various points in time. Pixels 804-812 are represented as having values 251, 253, 252, 252 and 254, respectively. For simplicity, and purposes of illustration, all surrounding pixel values, even those values (not shown) outside of sliding window 802, are shown as having a value of "A", where "A" differs noticeably in value from the values of pixels 804-812. The value of "A" is not constrained to be a constant value, but to represent a broad array of pixel values that noticeably differ from values associated with pixels 804-812. As an example, "A" represents various values such that A<<251. Each of pixels 804-812 are filtered using example 5×5 siding window 802 such that all pixels other than pixels 804-812 will be assumed to have a value of "A". As such, pixels 804-812 represent a 1-pixel wide curve, edge, line or other fine detail in a source image that is desired to be preserved after salt and pepper filtering is performed.

Ordered sequence 814 represents a sorted array of pixel values for example 5×5 window centered on pixel 804. Using median filtering, pixel 804 is mapped to a value of "A". However, using the filtering with minimal loss of detail described herein, with $D_R=2$, corresponding to the $2^{nd}$ pixel value (i.e., 253) from the right edge of sorted array 814, pixel 804 is unaltered, and mapped to its current value of 251. This is because 251<253. Thus, pixel 804 is outside of the clamped region on the right edge of sorted array 814. If $D_R=3$, corresponding to the $3^{rd}$ pixel value (i.e., 252) from the right edge of sorted array 814, pixel 804 is still unaltered, and mapped to its current value of 251. This is because 251<252. Thus, pixel 804 is outside of the clamped region on the right edge of sorted array 814. As such, pixel 804 is in a middle region of the sorted array 814.

A review of ordered sequences 814-822 shows that using median filtering, all values of center pixels 804-812 are mapped to a corresponding median value of "A". Thus, in an effort to remove salt and pepper noise from the scanned image, the fine detail represented by pixels 804-812 are removed by median filtering.

Figure 9:
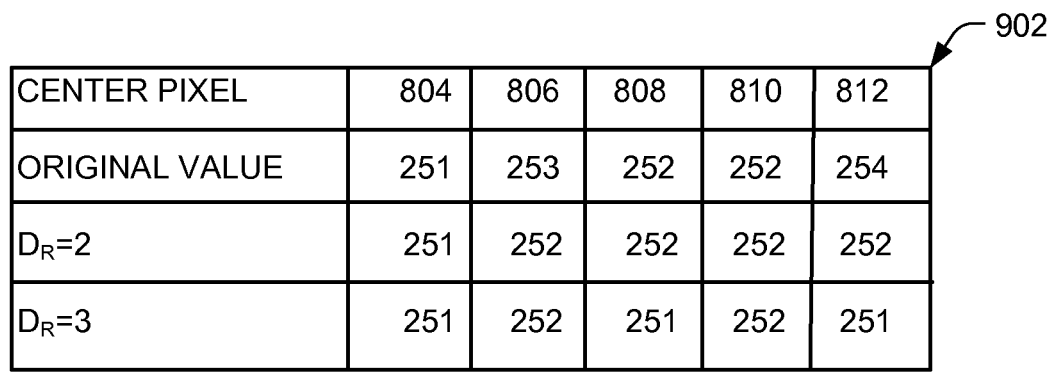
FIG. 9 is a table illustrating an example method of 2-Dimensional window filtering with minimal loss of detail.

FIG. 9 illustrates table 902 of various values of pixels 804-812 that may be generated using filtering with minimal loss of detail described herein, with values of $D_R=2$ or 3. As an example, pixel 804 has an original value of 251, where filtering with minimal loss of detail using $D_R=2$ or 3 left pixel 804's value unaltered. Likewise, table 902 illustrates that values of pixels 806, 808, 810 and 812 have been unaltered or minimally altered using values of $D_R=2$ or 3. Thus, the fine detail associated with pixel values 804-812 have been preserved after salt and pepper filtering is performed using filtering with minimal loss of detail described herein.

Figures 10A, 10B:
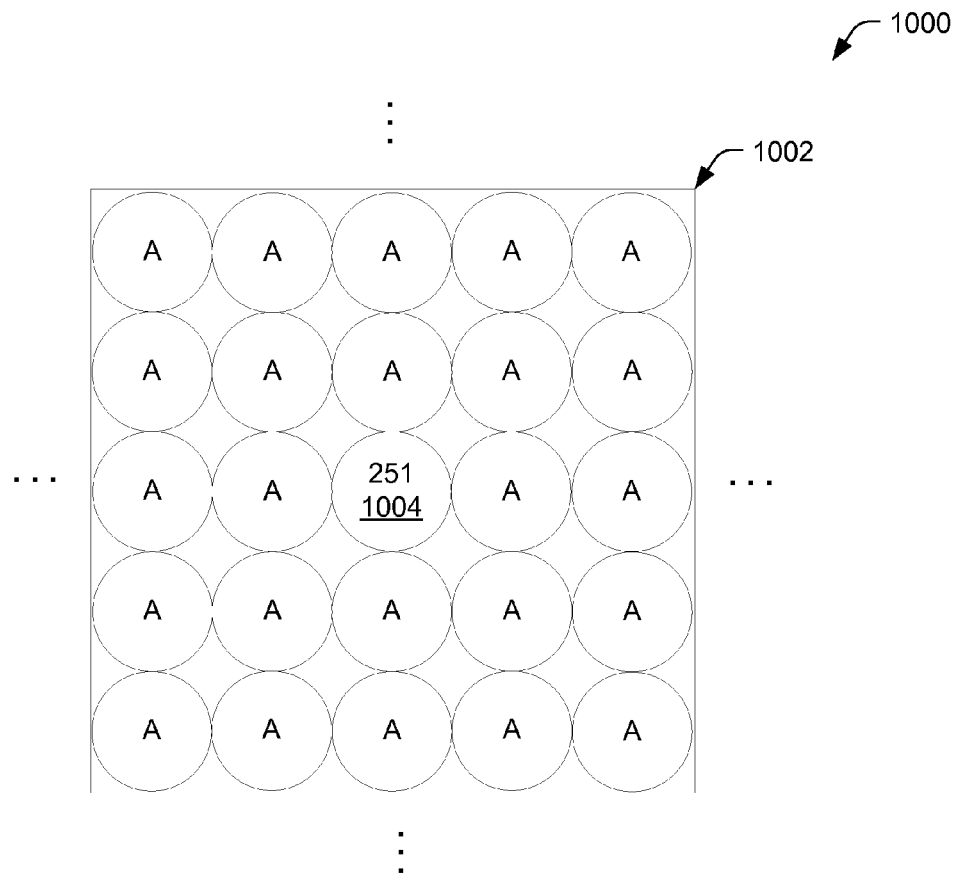
FIGS. 10a and 10b are other diagrams illustrating another example method of 2-Dimensional window filtering to reduce salt and pepper noise.

FIGS. 10a and 10b illustrate example environment 1000 of filtering using a 2-D siding window to perform salt and pepper filtering. FIG. 10a illustrates an example of filtering samples (e.g., pixels) of a source image using 5×5 siding window 1002. Pixel 1004 is represented as having a value of 251. As similar for example environment 800 of FIG. 8, for simplicity, and purposes of illustration, all surrounding pixel values, even those values (not shown) outside of sliding window 1002, are shown as having a value of "A", where "A" differs noticeably in value from the value of pixel 1004.

Ordered sequence 1006 represents a sorted array of pixel values for example 5×5 window centered on pixel 1004. Using median filtering, pixel 1004 is mapped to a value of "A". Likewise, using the filtering with minimal loss of detail described herein, with $D_R=2$, corresponding to the $2^{nd}$ pixel value (i.e., A) from the right edge of sorted array 1006, pixel 1004 is also mapped to a value of "A" that is $2^{nd}$ closest in value to the value of pixel 1004, as opposed to the median value. If corresponding to the $3^{rd}$ pixel value (i.e., A) from the right edge of sorted array 1006, pixel 1004 is mapped to a value of "A" that is $3^{rd}$ closest in value to the value of pixel 1004, as opposed to the median value. Other values of $D_R$ (or $D_L$) may be used to facilitate salt and pepper filtering such that pixel 1004 may be replaced with a $4^{th}$ or a $5^{th}$ closest value. Values of $D_R$ (or $D_L$) may be selected such that a fine detail of a pixel width of N>1 may be mapped to a pixel width that may be less than N.

FIGS. 8-10 illustrate 2-D filtering using a 5×5 window, however, such a window size is not to be viewed as a constraint, as other window sizes may be used. As examples, windows of sizes 7×7, 5×9, 9×9, as well as windows of other sizes may be used to implement the filtering with minimal loss of detail described herein. In an aspect, 2-D filtering windows may be used that have a weighted windowing function.

Example Methods of Filtering Noise

Figure 11:
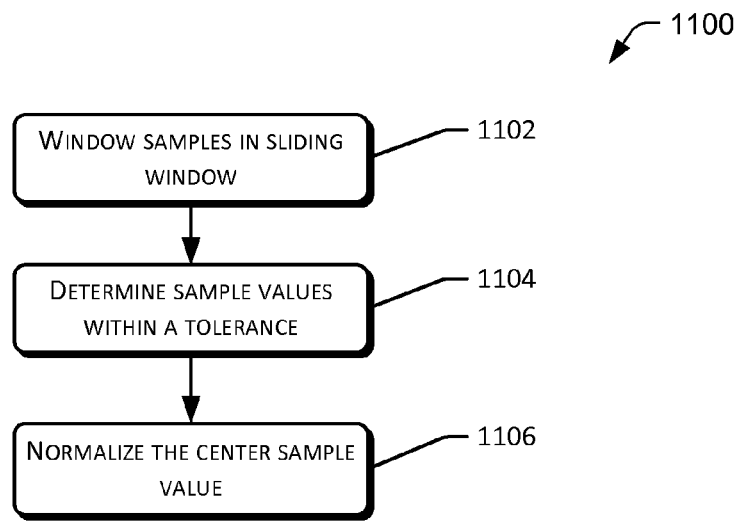
FIG. 11 is a flow diagram further illustrating a method of filtering noise in a scanned image that minimizes a loss of detail in the scanned image.

FIG. 11 illustrates an example method 1100 of filtering noise in a scanned image that minimizes a loss of detail in the scanned image. As an example, the filtering is performed by processing logic 208, illustrated in FIG. 2. At block 1102, samples of the scanned image are windowed in a first sliding window. As an example, referring to FIG. 4, the samples are illustrated by samples on curve 302 that are windowed by filter window 412, such as samples [25, 30, 18, 21, 27, 210, 215]. As such, at a first point in time, a plurality of samples, and the associated values of the samples, that fall within a sliding window are determined. At block 1104, sample values of the samples within a tolerance of a center sample value in the first sliding window are determined. As an example, referring to FIG. 4, with a tolerance of +/−10 selected, samples [25, 30, 18, 21, 27] are determined. As such, samples which have values that are within a tolerance of a value of a sample that is centered within the sliding window at the first point in time are determined.

At block 1106, the center sample value (e.g., value 21 in FIG. 4) is normalized based at least in part on the center sample value and the sample values within the tolerance. If the normalizing includes a simple average of the center sample value (e.g., the value of the sample that is centered within the sliding window) and the sample values within the tolerance (e.g., samples with values that are within the tolerance of the value of the sample that is centered within the sliding window), then as described in FIG. 4, the center value of 21 is normalized to a value of 24.2, where the filtering normalizes the center sample to a value of 24. If the normalizing includes a weighted average of the center sample value and the sample values within the tolerance, then the center sample is normalized to a different value that depends on the type of weighting utilized.

The filtering described in method 1100 may be used to filter random noise or Gaussian noise. As shown in FIG. 4, with a tolerance of +/−10 selected, the loss of detail in the scanned image has been minimized, as shown by comparing sample values 304-310 to filtered sample values 404-410. As filter window 412 is slid across samples on curve 302 of FIG. 4, tolerance values can be selected based at least in part on a noise characteristic of a sensor (e.g., scanning element 104) of the image scanner and a current center sample value.

The filtering described in method 1100 may also be used to filter salt and pepper noise and include windowing samples of the scanned image in a second sliding window, wherein the samples in the second sliding window include a center sample (e.g., a sample that is centered within the second sliding window); sorting sample values of the samples in the second sliding window into a sorted array of the values of the samples; applying a first clamp level to an end of the sorted array; applying a second clamp level to an opposite end of the sorted array; and assigning a mapped value associated with the center sample based at least in part on a location of the center sample in the sorted array relative to the first clamp level and the second clamp level, wherein the mapped value is assigned a value of the center sample when the location of the center sample is between the first clamp level and the second clamp level in the sorted array; the mapped value is assigned a value of a sample at the first clamp level when the location of the center sample is within the first clamp level in the sorted array; and the mapped value is assigned a value of a sample at the second clamp level when the location of the center sample is within the second clamp level in the sorted array.

The first clamp level may be represented by $D_L$ that corresponds to a number of samples from a left edge of the sorted array and the second clamp level may be represented by $D_R$ that corresponds to a number of samples from a right edge of the sorted array and there are multiple samples between the first clamp level and the second clamp level in the sorted array. The first sliding window may be a 1-dimensional window that performs the windowing in a horizontal direction of the scanned image and in a vertical direction of the scanned image. As an example, a scanned image may be first windowed in a horizontal direction by 1-D filter window 412. Then the scanned image may be windowed in a vertical direction by a vertically rotated 1-D filter window 412 to facilitate filtering of the noise.

Figure 12:
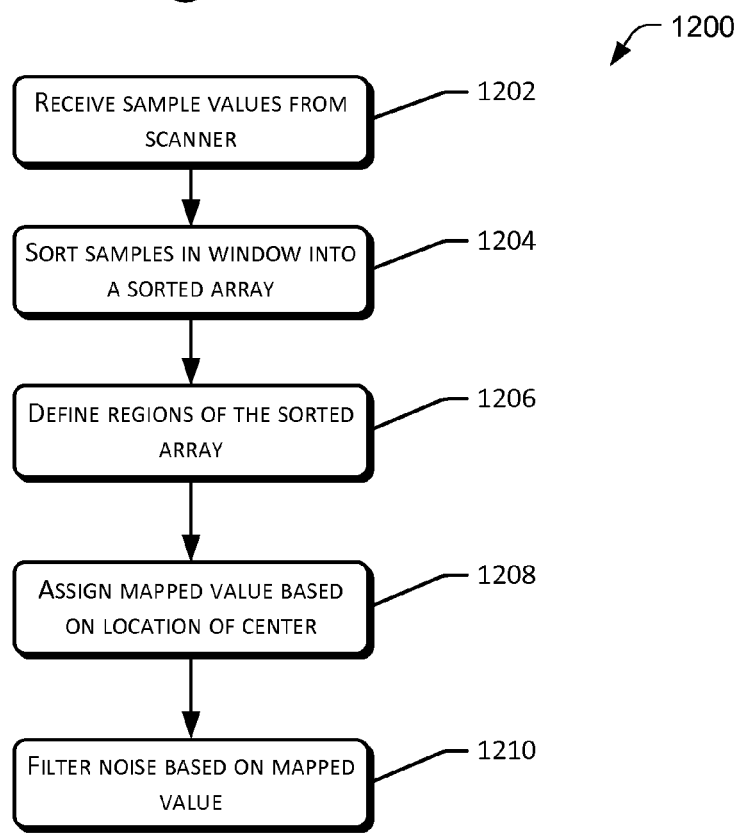
FIG. 12 is a flow diagram further illustrating another method of filtering noise in a scanned image that minimizes a loss of detail in the scanned image.

FIG. 12 illustrates an example method 1200 of filtering noise in an image (e.g., a scanned image) that minimizes a loss of detail in the image. As an example, the filtering is performed by processing logic 208, illustrated in FIG. 2. At block 1202, sample values of samples of a source image (e.g., from scanning element 104 of the image scanner) are received. As an example, at a first point in time, values of samples of an image that fall within a sliding window (e.g., a 2-dimensional sliding window) are determined, wherein the samples of the image within the sliding window include a sample that is centered within the sliding window at the first point in time. At block 1204, samples in a sliding window centered on a first center sample are sorted into a sorted array of sorted samples (e.g., ordered sequence 508). The sliding window may be 2-D, such as sliding window 802 in FIG. 8*a*, such that the samples in the sliding window are sorted into a sorted array of the values of the samples. At block 1206, distinct regions of the sorted array may be defined, such that each of the distinct regions has multiple samples of the sorted samples. As an example, assuming $D_R=D_L=2$, three distinct regions are formed in ordered sequence 814, such that each of the three distinct regions contain multiple samples. Furthermore, the three distinct regions may be contiguous regions.

At block 1208, a mapped value is assigned for the sample that is centered within the sliding window based at least in part on which of the three distinct regions the center sample is located within the sorted array. FIG. 9 illustrates mapped values for center samples located in a middle region and a right region defined by $D_R$. FIG. 9 may be easily extended to describe mapped values for center samples located in a left region defined by $D_L$. At block 1210, mapped values facilitate filtering salt and pepper noise from the scanned image while minimizing a loss of detail in the scanned image, as illustrated by example environment 800 of FIG. 8.

Example environment 400 of FIG. 4 provides an example of filtering noise by an image scanner by determining sample values in a 1-dimensional sliding window centered on a second center sample that are within a tolerance of a value of the second center sample; determining a normalized value for the second center sample based at least in part on the value of the second center sample and the sample values that are within the tolerance; and filtering random noise from the scanned image while minimizing the loss of detail in the scanned image based at least in part on the normalized value.

As shown herein, FIGS. 11 and 12 describe methods for filtering different kinds of noise, while minimizing a loss of detail in the scanned image. In an embodiment, each filtering method may be used alone. In another embodiment, filtering techniques described herein may be combined. As an example, the method as described in FIG. 11 may be used to filter random noise, and the method described in FIG. 12 may be used to filter salt and pepper noise in a scanned image. In an aspect, the filtering methods described herein may be performed during a scanning process. As an example, processing logic 208 may window data at least with a 1-D window as it is being received from scanning element 104 via data bus 204. As another example, processing logic 208 may receive samples from scanning element 104 via data bus 204 such that 2-D windowing may be performed during the actual scanning process. In an aspect, all, or at least a portion of the filtering described herein may be performed during a scanning process as processing logic 208 receives samples from scanning element 104.

In an alternate embodiment, the filtering methods described herein may be applied to perform non-image signal processing, such as for processing signals from a variety of other sensors, such as biometric sensors, acoustic sensors, radio frequency (RF) sensors, or the like. In an alternate embodiment, the filtering methods described herein may be applied to video. As an example, if similar value pixels are in the next or previous frame in similar locations, that may be included in the average (or weighted average) for the current pixel in the current frame for filtering noise from video frame sequences. Similar extensions could also be applied to the salt/pepper noise reduction. As an example, pixels from previous and future frames may be included when looking for pixels to include in the sorting that will be used for determining there is a pixel that needs to be clamped or replaced.

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "unit," "component," and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described.

What is claimed is:

1. A method of filtering noise in an image in order to minimize a loss of detail in the image, the method comprising:
   determining a plurality of samples of the image that fall within a sliding window, wherein the plurality of samples of the image in the sliding window include a first sample that is centered within the sliding window;
   determining values of each of the plurality of samples, wherein the first sample has a first value;
   sorting the values of each of the plurality of samples into a sorted array of the values of the plurality of samples;
   applying a first clamp level to a first end of the sorted array;
   applying a second clamp level to a second end of the sorted array, wherein the second end of the sorted array is opposite to the first end of the sorted array; and
   assigning a second value to the first sample,
   wherein in response to the location of the first value of the first sample in the sorted array being between (i) the first clamp level in the sorted array and (ii) the second clamp level in the sorted array, the second value is equal to the first value,
   wherein in response to the location of the first value of the first sample being within the first clamp level in the sorted array, the second value is equal to a value of a sample at the first clamp level in the sorted array, and
   wherein in response to the location of the first value of the first sample being within the second clamp level in the sorted array, the second value is equal to a value of a sample at the second clamp level in the sorted array.

2. The method of claim 1, wherein sorting the values of each of the plurality of samples into the sorted array of the values of the plurality of samples comprises:
   sorting the values of each of the plurality of samples into the sorted array such that the values of each of the plurality of samples in the sorted array are sorted in an ascending order.

3. An optical scanner, comprising:
   a scanning element configured to scan an image; and
   a processor configured to
      determine values of samples of the image, provided by the scanning element, that fall within a sliding window, wherein the samples of the image in the sliding window include a first sample that is centered within the sliding window,
      sort values of the samples of the image within the sliding window into a sorted array of the values of the samples within the sliding window,
      define three distinct regions of the sorted array, wherein each of the three distinct regions has multiple values of the samples within the sliding window, wherein the three distinct regions of the sorted array include (i) a left region that includes N of the values of the samples from a left edge of the sorted array, (ii) a right region that includes M of the values of the samples from a right edge of the sorted array, and (iii) a middle region that includes values of the samples between the $N^{th}$ value of the samples and the $M^{th}$ value of the samples of the sorted array, wherein N and M are integers greater than one, and
      assign a mapped value associated with the first sample,
      wherein in response to the value of the first sample residing in the left region of the sorted array, the mapped value is assigned a value of the $N^{th}$ sample,
      wherein in response to the value of the first sample residing in the right region of the sorted array, the mapped value is assigned a value of the $M^{th}$ sample, and
      wherein in response to the value of the first sample residing in the middle region of the sorted array, the mapped value is assigned the value of the first sample.

4. The optical scanner of claim 3, wherein the values of the plurality of samples are sorted in an ascending order in the sorted array.

5. The optical scanner of claim 3, wherein N is equal to M.

6. The optical scanner of claim 3, wherein N is not equal to M.

7. A method of filtering noise, the method comprising:
   determining values of samples of an image that fall within a sliding window, wherein the samples of the image within the sliding window include a first sample that is centered within the sliding window;
   sorting values of the samples in the sliding window into a sorted array of the values of the samples;
   defining three distinct regions of the sorted array of the values of the samples, each of the three distinct regions having multiple values of the samples within the sliding window, wherein the three distinct regions include (i) a left region that includes N of the values of the samples from a left edge of the sorted array, (ii) a right region that includes M of the values of the samples from a right edge of the sorted array, and (iii) a middle region that includes values of the samples between the $N^{th}$ value of the samples and the $M^{th}$ value of the samples of the sorted array, wherein N and M are integers greater than one;
   assigning a mapped value associated with the first sample; and
   while minimizing a loss of detail in the image based at least in part on the mapped value, filtering salt and pepper noise from the image,
   wherein in response to the value of the first sample residing in the left region of the sorted array, the mapped value is assigned a value of the $N^{th}$ sample, and
   wherein in response to the value of the first sample residing in the right region of the sorted array, the mapped value is assigned a value of the $M^{th}$ sample.

8. The method of claim 7, wherein in response to the value of the first sample residing in the middle region of the sorted array, the mapped value is assigned a value of the first sample.

9. The method of claim 7, wherein the values of the plurality of samples are sorted in an ascending order in the sorted array.

10. The method of claim 7, wherein N is equal to M.

11. The method of claim 7, wherein N is not equal to M.

12. The method of claim 1, wherein:
the noise is (i) random noise or (ii) Gaussian noise.

13. The method of claim 1, wherein:
filtering noise of the image is performed by an image scanner.

14. The method of claim 1, wherein:
the noise is salt and pepper noise; and
filtering noise in the image filters the salt and pepper noise based at least in part on the second value assigned to the first sample.

15. The method of claim 1, wherein:
the first clamp level in the sorted array is a number of samples from a left edge of the sorted array;
the second clamp level in the sorted array is a number of samples from a right edge of the sorted array; and
there are multiple samples between the first clamp level and the second clamp level in the sorted array.

16. The method of claim 1, wherein the sliding window is a 1-dimensional window that performs a windowing function in (i) a horizontal direction of the image and (ii) a vertical direction of the image.

17. The optical scanner of claim 3, wherein the processor is further configured to:
filter random noise from the image while minimizing a loss of detail in the image based at least in part on the assigned mapped value.

18. The optical scanner of claim 3, wherein the processor is further configured to:
filter salt and pepper noise from the image; and
minimize loss of detail in the image based at least in part on the mapped value.

\* \* \* \* \*